United States Patent
Mouli et al.

(10) Patent No.: US 7,553,472 B2
(45) Date of Patent: Jun. 30, 2009

(54) NANOTUBE FORMING METHODS

(75) Inventors: Chandra Mouli, Boise, ID (US); Gurtej S. Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 625 days.

(21) Appl. No.: 11/168,742

(22) Filed: Jun. 27, 2005

(65) Prior Publication Data

US 2007/0071668 A1  Mar. 29, 2007

(51) Int. Cl.
*D01F 9/12* (2006.01)
*D01C 5/00* (2006.01)
*B05D 1/32* (2006.01)
*B05D 1/40* (2006.01)
*B82B 1/00* (2006.01)
*B82B 3/00* (2006.01)

(52) U.S. Cl. .............. 423/447.3; 423/447.1; 423/447.2; 427/282; 427/331; 977/843

(58) Field of Classification Search ............. 423/447.1, 423/447.2, 447.3; 427/282, 331; 977/843
See application file for complete search history.

(56) References Cited

U.S. PATENT DOCUMENTS

| | | | |
|---|---|---|---|
| 7,105,428 B2 * | 9/2006 | Pan et al. ..................... | 438/584 |
| 2004/0197638 A1 * | 10/2004 | McElrath et al. ............... | 429/44 |
| 2006/0067871 A1 * | 3/2006 | Hart et al. ................. | 423/447.3 |
| 2007/0071668 A1 * | 3/2007 | Mouli et al. ............. | 423/447.3 |

OTHER PUBLICATIONS

Jourdain et al. Sequential catalytic growth of carbon nanotubes. Chemical Physics Letters 364 (2002) 27-33.*

Collins et al. Engineering carbon nanotubes and nanotube circuits using electrical breakdown. Science 292, 706 (2001).*

Javey et al.; *Ballistic carbon nanotube field-effect transistors*; Nature, vol. 424, Aug. 7, 2003, pp. 654-657.

Teo et al.; *Characterization of plasma-enhanced chemical vapor deposition carbon nanotubes by Auger electron spectroscopy*; J. Vac. Sci. Technol. B 20(1), Jan./Feb. 2002, pp. 166-121.

D'yachkov et al.; *Electron structure and interband transitions of semiconducting carbon nanotubes*; 2004 American Institute of Physics, vol. 95, No. 1, pp. 399-401.

Kim et al.; *Electronic structures of capped carbon nanotubes under electric fields*; 2002 The American Physical Society, Physical Review B, vol. 65, pp. 1-6.

Kariuawasam; *Field Emission of Carbon Nanotubes*; Department of Physics, University of Cincinnati, pp. 1-6.

(Continued)

*Primary Examiner*—Jerry Lorengo
*Assistant Examiner*—Jennifer A Smith
(74) *Attorney, Agent, or Firm*—Wells St. John P.S.

(57) ABSTRACT

A nanotube forming method includes growing a plurality of nanotubes to an intermediate length that is deterministic of nanotube intrinsic conductivity. Individual nanotubes exhibit an effective conductivity, which varies among the plurality of nanotubes. The method includes completing growth of nanotubes exhibiting effective conductivities inside a selected range without completing growth of nanotubes exhibiting effective conductivities outside the selected range. Before completing nanotube growth, the method may further include stopping nanotube growth and screening out nanotubes exhibiting conductivities outside the selected range. The screening out of nanotubes may include deforming or masking nanotubes exhibiting conductivities outside the selected range. Deforming nanotubes may include applying a potential.

12 Claims, 5 Drawing Sheets

OTHER PUBLICATIONS

Teh et al.; *Integrating vertically aligned carbon nanotubes on micromechanical structures*; J. Vac. Sci. Technol. B 21(4), Jul./Aug. 2003, pp. 1380-1383.

Javey, A. et al., "Electrical Properties and Devices of Large-Diameter Single-Walled Carbon Nanotubes", App. Physics Letters, vol. 80, No. 6 (Feb. 11, 2002), pp. 1064-1066.

Lin, M.C. -C et al., "Characteristic of Field Emission from Carbon Nanotubes Synthesized from Different Sources", Mater. Phys. Mech. 4 (2001), pp. 138-142.

Product Brochure: "E-Beam Lithography", New Jersey Nanotechnology Consortium, copyright 2003, New Jersey, 2 pgs.

Report: Hollister, P., et al., "Nanotubes White Paper", CMP Cientifica, Jan. 2003, pp. 1-13.

Website: "E-Beam Lithography", Rockwell Scientific, http://www.rsc.rockwell.com/ebeam_lithography/, reprinted Mar. 31, 2005, 1 pg.

* cited by examiner

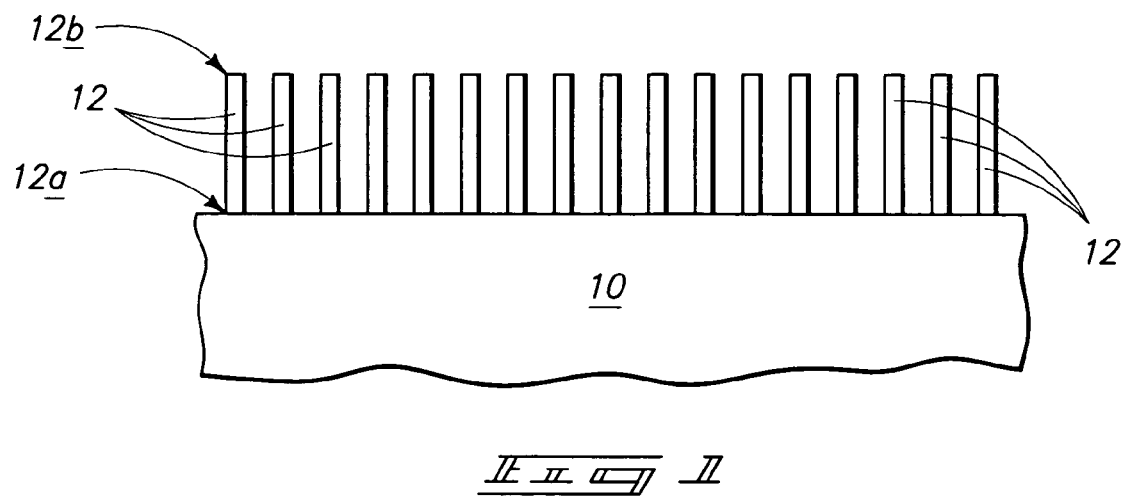
_Fig. 1_
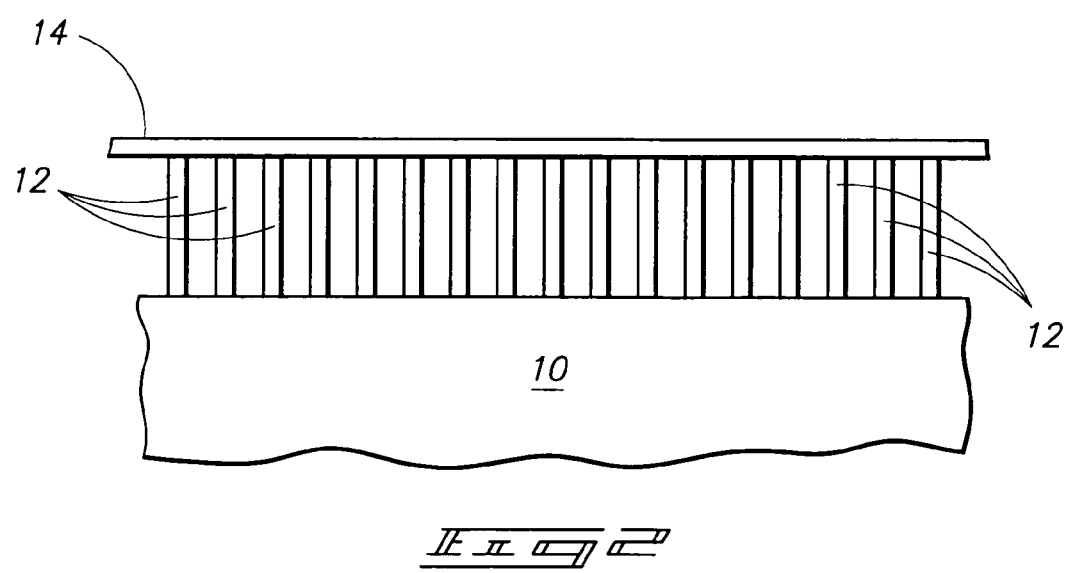
_Fig. 2_

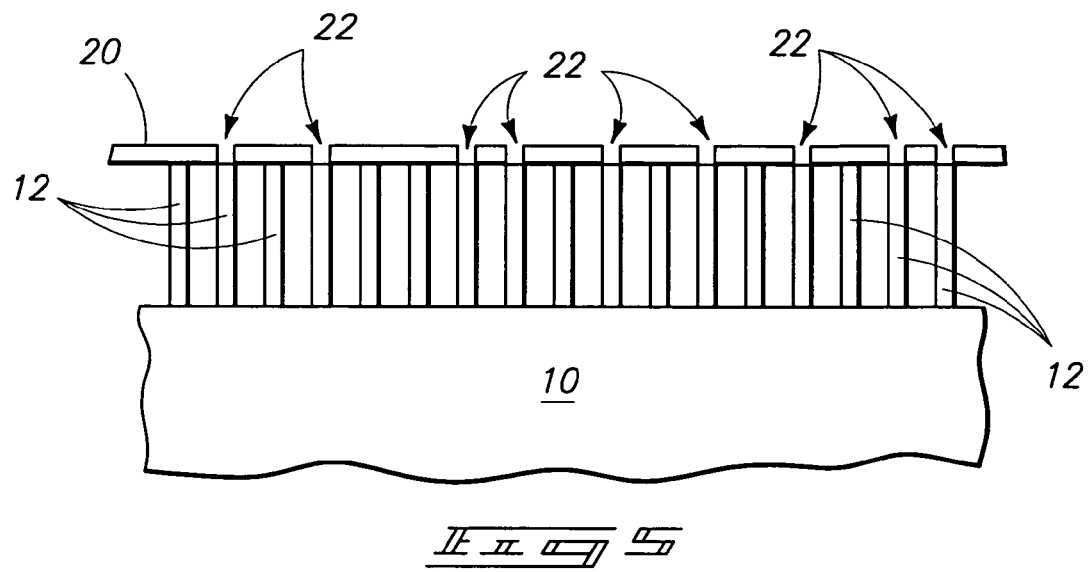
F I G 5
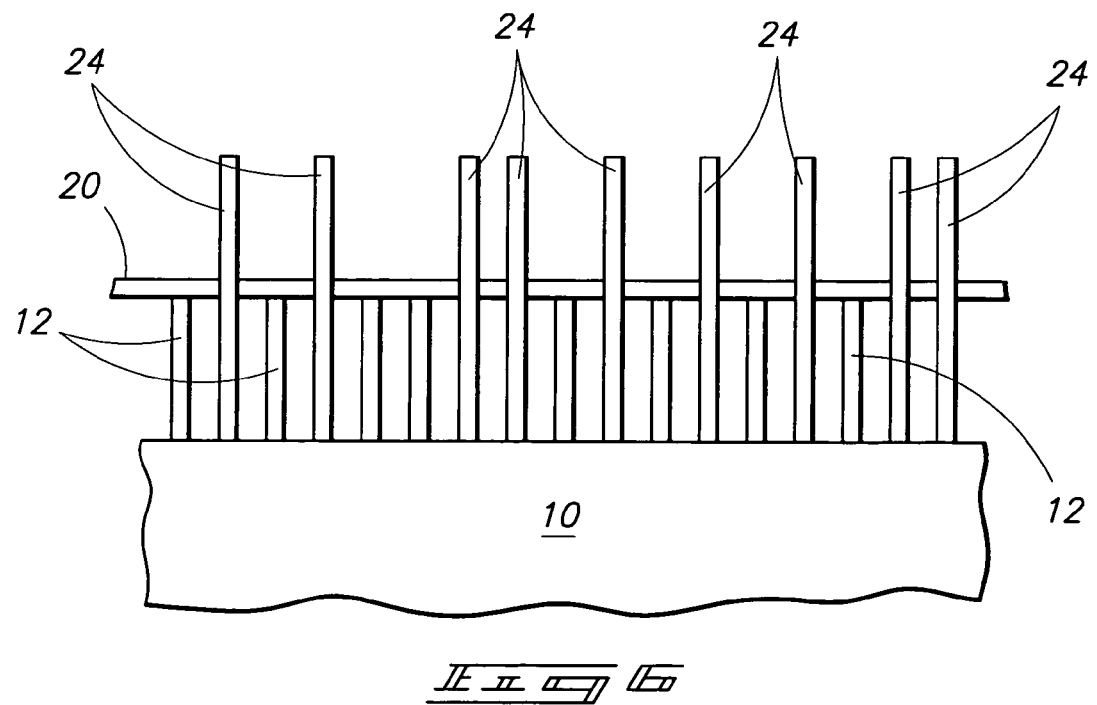
F I G 6

NANOTUBE FORMING METHODS

TECHNICAL FIELD

The invention pertains to nanotube forming methods, including but not limited to methods using nanotube screening.

BACKGROUND OF THE INVENTION

Nanotubes are well known structures exhibiting useful structural, electrical, thermal, and other properties presently of interest in a wide variety of technology areas. Nanotubes may exhibit a variety of intrinsic conductivity states. Most fabrication techniques used to grow or deposit nanotubes produce a mixture of single-wall nanotubes (SW-NT) and multiwall nanotubes (MW-NT). Fabrication techniques may also produce nanotubes of varying diameter. Further, fabrication techniques may produce a variety of chiralities (zigzag, armchair, and chiral). In addition to their composition and perhaps other physical properties, the listed characteristics can influence whether a nanotube is "metallic" (that is, conductive), semiconductive, or insulative. For single-wall carbon nanotubes, armchair varieties are typically metallic, chiral varieties are typically semiconductive, and zigzag varieties are typically semiconductive, but may exhibit a small band gap and so can be termed "quasimetallic."

For some applications, the electrical properties of nanotubes may be of small consequence. However, for other applications, providing nanotubes exhibiting a particular range of conductivity may be essential. The difficulty in sorting nanotubes according to their electrical properties and/or controlling fabrication methods to produce selected electrical properties remains a major challenge in producing nanotubes and in using nanotubes in certain applications. In the area of electronic devices, nanotubes may be suitable as a dielectric for passive elements (e.g., capacitors), as switches, as interconnects, as channel regions in field effect transistors, as field emitters, etc., wherein absence of a particular electrical property may disqualify a nanotube for use.

Due to their mechanical strength, nanotubes have been proposed for use as fillers in concrete and other structural materials. Although at first not appearing to constitute a significant factor, nanotube conductivity might also play some role in achieving the properties desired in applications that do not involve electronic devices. As one possibility, conductivity might be indicative of structural properties such as diameter, chirality, number of walls, etc. and thus indirectly indicate desirable structural properties.

Despite the wide variety of techniques known for producing nanotubes, a desire exists to more efficiently sort nanotubes and/or to control electrical properties during fabrication.

SUMMARY OF THE INVENTION

According to one aspect of the invention, a nanotube forming method includes growing a plurality of nanotubes on a substrate at least to an intermediate length that is deterministic of nanotube intrinsic conductivity. Individual nanotubes exhibit an effective conductivity, which varies among the plurality of nanotubes, with some of the effective conductivities being inside a selected range while others are outside the selected range. The method includes completing growth of nanotubes exhibiting effective conductivities inside the selected range without completing growth of nanotubes exhibiting effective conductivities outside the selected range.

By way of example, before completing the growth of nanotubes, the method may further include stopping nanotube growth and screening out nanotubes exhibiting conductivities outside the selected range. The screening out of nanotubes may include deforming or masking nanotubes exhibiting conductivities outside the selected range. Deforming nanotubes may include applying a potential. Regardless of whether the screening out of nanotubes includes deforming, masking, or another technique, the screening out may include depositing a conductive material in electrical contact with the initial ends of at least some of the nanotubes and using at least some of the deposited conductive material for the screening out.

According to another aspect of the invention, a nanotube forming method includes growing a plurality of nanotubes on a substrate at least to an intermediate length that is deterministic of nanotube intrinsic conductivity. Individual nanotubes have a terminal end contacting the substrate, have an initial end, and exhibit an effective conductivity, which varies among the plurality of nanotubes, with some of the effective conductivities being inside a selected range while others are outside the selected range. The method includes depositing a conductive material in electrical contact with the initial ends of at least some of the nanotubes and screening out nanotubes exhibiting conductivities outside the selected range using at least some of the deposited conductive material.

According to a further aspect of the invention, a nanotube forming method includes vertically growing a plurality of single-wall carbon nanotubes on a substrate to a completed length. Individual nanotubes exhibit an effective conductivity, which varies among the plurality of nanotubes, with some of the effective conductivities being inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes depositing a conductive material in electrical contact with the initial ends of at least some of the nanotubes, using at least some of the deposited conductive material, and deforming nanotubes exhibiting conductivities outside the selected range. By way of example, depositing the conductive material may include blanket depositing a metal layer over the nanotube initial ends and patterning the metal layer into metal lines.

According to a yet further aspect of the invention, a nanotube forming method includes vertically growing a plurality of single-wall carbon nanotubes on a substrate at least to an intermediate length that is deterministic of nanotube intrinsic conductivity. Individual nanotubes exhibit an effective conductivity which varies among the plurality of nanotubes, with some of the effective conductivities inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes stopping nanotube growth, depositing a conductive material in electrical contact with the initial ends of at least some of the nanotubes, using at least some of the deposited conductive material, and deforming nanotubes exhibiting conductivities outside the selected range. The method further includes completing growth of nanotubes exhibiting effective conductivities inside the selected range without completing growth of nanotubes exhibiting effective conductivities outside the selected range.

According to a still further aspect of the invention, a nanotube forming method includes vertically growing a plurality of single-wall carbon nanotubes on a substrate at least to an intermediate length that is deterministic of nanotube intrinsic conductivity. Individual nanotubes exhibit an effective conductivity, which varies among the plurality of nanotubes with some of the effective conductivities being inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes stopping nanotube growth and depositing a conductive material as a mask in electrical contact with the initial ends of at least the nanotubes exhibiting conductivities outside the selected range. The method further includes completing growth of nanotubes exhibiting effective conductivities inside the selected range without completing growth of nanotubes exhibited effective conductivities outside the selected range.

According to still another aspect of the invention, a nanotube forming method includes growing a plurality of nanotubes on a substrate at least to an intermediate length that is deterministic of nanotube intrinsic conductivity. Individual nanotubes have a terminal end contacting the substrate, have an initial end, and exhibit an effective conductivity, which varies among the plurality of nanotubes, with some of the effective conductivities being inside a selected range while others are outside the selected range. The method includes depositing a conductive material in electrical contact with the initial ends of at least some of the nanotubes and screening out nanotubes exhibiting conductivities outside the selected range using at least some of the deposited conductive material.

BRIEF DESCRIPTION OF THE DRAWINGS

Preferred embodiments of the invention are described below with reference to the following accompanying drawings.

FIG. 1 is a side view of nanotubes grown on a substrate at a process step according to one aspect of the invention.

FIG. 2 is a side view of nanotubes at a process step subsequent to that shown in FIG. 1.

FIG. 5 is a side view of nanotubes at a process step subsequent to that shown in FIG. 2 according to an alternative aspect of the invention.

FIG. 6 is a side view of nanotubes at a process step subsequent to that shown in FIG. 5.

DETAILED DESCRIPTION OF THE PREFERRED EMBODIMENTS

Figure 9:
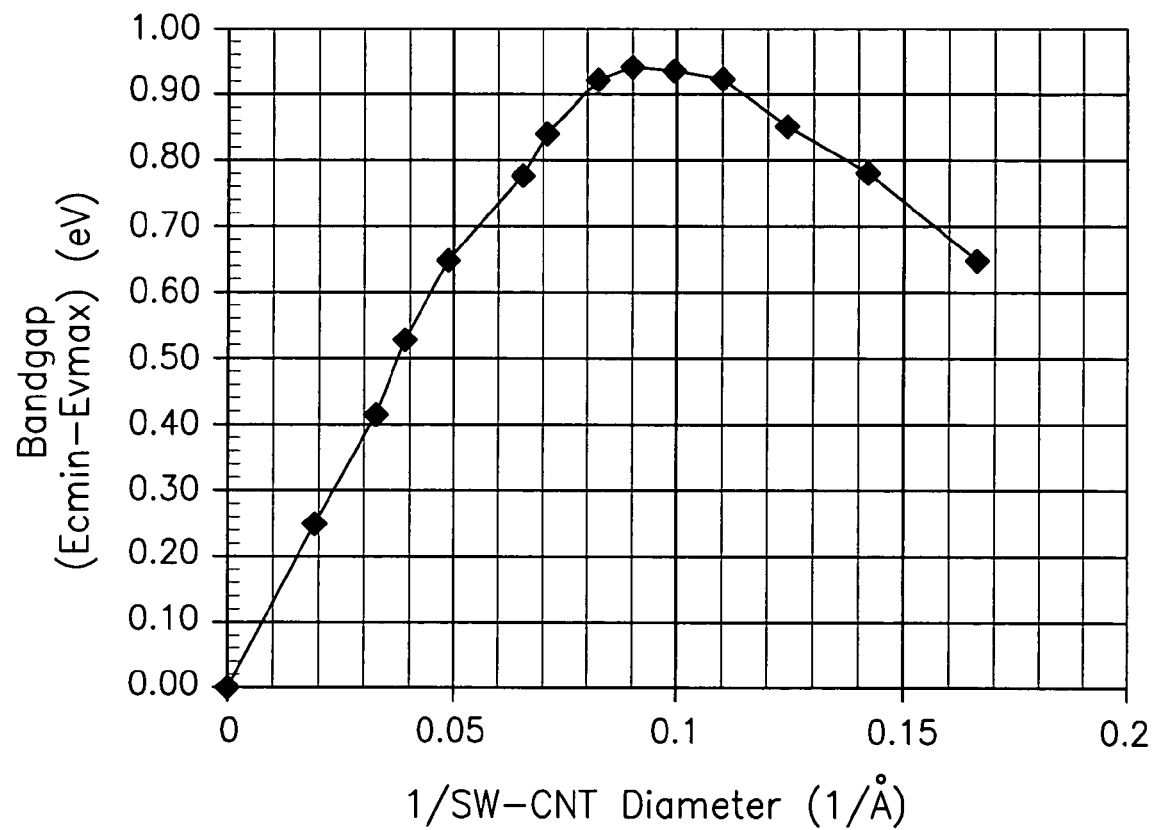
FIG. 9 is a chart showing the dependence of band gap on single-wall carbon nanotube diameter.

FIG. 9 shows a chart of single-wall carbon nanotube (SW-CNT) band gap with respect to inverse nanotube diameter. $E_{cmin}$ is the minimum energy of the conduction band and $E_{vmax}$ is the maximum energy of the valence band. The band gap values in FIG. 9 are based upon tight binding calculations and yield a band gap range of from about 0.3 to about 0.9 electron volts (eV) for respective diameters of from about 50 to about 6 Angstroms. Generally, materials exhibiting a band gap of from about 0.5 to 1.0 eV may be most suitable for a semiconductive channel. Materials that do not exhibit a band gap may be considered conductive (for example, metallic nanotubes). Semiconductive materials exhibiting a band gap less than about 0.01 eV may be considered quasimetallic. Based upon the calculations shown in FIG. 9 for (7,12) chiral SW-CNT, tubes with diameters greater than about 27 Angstroms exhibit a band gap less than 0.5 eV and are less suitable for a semiconductive channel. (According to the chiral vector (n,m) notation used by those of ordinary skill, (n,0) denotes a zigzag tube and (n,n) denotes an armchair tube, where n and m are different, whole numbers.) Per FIG. 9, SW-CNT with diameters at least as low as about 6 Angstroms may be suitable for a semiconductive channel.

In the context of the present application, a semiconductive material exhibits a conductivity of from $10^{-12}$ to about $10^{-4}$ microOhm$^{-1}$ centimeter$^{-1}$. Conductive materials exhibit a higher conductivity while insulative materials exhibit a lower conductivity. For carbon nanotubes, the various conductivities that may be exhibited are often the result of intrinsic characteristics rather than the presence or absence of dopants as in other materials.

The various aspects of the inventions described herein may be applicable to a variety of techniques for forming nanotubes and to a variety of nanotube materials. However, particular advantage is believed to exist for use of the described methods in forming carbon nanotubes by methods involving growth from a substrate with a metal seed layer formed thereon. Seed layers may be arranged in individual circle patterns, which will largely determine the diameter of a nanotube grown from the circle pattern. Even though tube diameter constitutes a significant factor in establishing nanotube band gap, other factors discussed herein and otherwise known may also influence band gap. The seed layer may be exposed to a precursor, such as a carbon-containing gas, under conventional process conditions to grow elemental carbon from the seed layer in the form of a SW-CNT. Understandably, defects may result in the nanotube, such as multiwalls (unless multiwalls are intended), intertwining of nanotubes, twisting of nanotubes, etc., that may also influence band gap. Aspects of the inventions described herein are particularly useful in screening and/or controlling nanotube intrinsic conductivity, but will be appreciated also to apply to screening varying conductivity that results from defects. Screening might be configured to occur on the basis of intrinsic conductivity alone, defects alone, or the two combined. Screening may also factor in other bases that cause conductivity variances.

In one aspect of the invention, a nanotube forming method includes growing a plurality of nanotubes on a substrate at least to an intermediate length that is deterministic of nanotube intrinsic conductivity. Individual nanotubes exhibit an effective conductivity, which varies among the plurality of nanotubes, with some of the effective conductivities being inside a selected range while others are outside the selected range. The method includes completing growth of nanotubes exhibiting effective conductivities inside the selected range without completing growth of nanotubes exhibiting effective conductivities outside the selected range. By way of example, the growing may include vertically growing and individual nanotubes may have a terminal end contacting the substrate and may have an initial end elevationally above the terminal end. Also, the effective conductivity may be exhibited between a nanotube terminal end contacting the substrate and a nanotube initial end and may be determined primarily by intrinsic conductivity and/or nanotube defects.

Before completing the growth of nanotubes, the method may further include stopping nanotube growth and screening out nanotubes exhibiting conductivities outside the selected range. A variety of screening techniques may be suitable. For example, the screening out of nanotubes may include deforming or masking nanotubes exhibiting conductivities outside the selected range. Deforming nanotubes may include applying a potential between the terminal end and initial end of the nanotubes and electrically deforming metallic nanotubes while not deforming semiconductive nanotubes and insulative nanotubes, if any insulative nanotubes are present. Regardless of whether the screening out of nanotubes includes deforming, masking, or another technique, the screening out may include depositing a conductive material in electrical contact with the initial ends of at least some of the nanotubes and using at least some of the deposited conductive material for the screening out.

Using the above described deposited conductive material may include applying a potential. In the alternative, or in addition, using the deposited conductive material may include masking selected initial ends. Due to the small tube diameters typically encountered, those of ordinary skill might refer to such a masking technique as "micromasking." Depositing the conductive material may include blanket depositing over the nanotube initial ends and selectively etching conductive material from the initial ends of nanotubes exhibiting effective conductivities either inside or outside the selected range. In the alternative or in addition, depositing the conductive material may include selectively depositing the conductive material on the initial ends of nanotubes exhibiting effective conductivities either inside or outside the selected range. Given the typical difference in conductivities among nanotubes, conventional techniques of electrochemical deposition and/or electrochemical etching may be used to deposit and/or etch conductive material on nanotubes exhibiting certain selected conductivities.

Generally, an intermediate length that is deterministic of nanotube intrinsic conductivity is from 100 Angstroms to 1 μm. Although a minimum and a maximum are listed for the above described range, it should be understood that more narrow included ranges may also be desirable. Observation has indicated that nanotube intrinsic conductivity is largely determined upon reaching a length of about 0.23 micrometers (μm) for a SW-CNT with a diameter between about 6 and 50 Angstroms vertically grown from a substrate.

For a semiconductive nanotube, the mode of charge transport may depend upon the type of conductive material in contact with the nanotube. By way of example only, palladium in contact with semiconductive nanotubes may produce p-type (hole) charge carriers while aluminum and gold may produce n-type (electron) charge carriers. N-type conduction in conventional silicon may be considerably much faster than p-type conduction apparently due to the sluggish nature of hole (p-type) conduction and hole mobility. In carbon nanotubes, the opposite may be observed so that p-type (hole) conduction is exceedingly faster, including faster than n-type (electron) conduction. During n-type (electron) conduction in semiconductive silicon, the electrons typically do not move in a straight-line path from source to drain. Instead, scattering of charge carriers through the semiconductive region occurs with a predominate flow from source to drain. In semiconductive carbon nanotubes, negligible scattering generally occurs so that both electron and hole conduction occur relatively fast, often referred to as "ballistic transport."

When forming a conductive material, in particular metal, contact to a semiconductor, a Schottky barrier may be formed. In the context of the present document, "metal" indicates a metal-containing material such as a metal compound, metal element, and/or metal alloys. A Schottky barrier is known as the energy barrier (conduction or valence band offsets) created at the interface between a conductive material contact and a semiconductor. The higher the Schottky barrier, the greater the resistance across the contact interface. The extent of a Schottky barrier may be determined by comparing the "work function" ($\Phi_m$) of the two materials at a given interface. Work function is defined as the energy needed to pull an electron at its Fermi level into vacuum. "Fermi" level is the energy level at which a 50% probability exists of finding electrons at that energy level.

A work function difference may exist between a conductive material and semiconductive nanotube and the difference may be larger in comparison to the work function difference between a conductive material and conductive nanotube. The difference may be significant enough to produce a comparably poor ohmic contact between the conductive material and semiconductive nanotube even when metals that exhibit the best possible wetting and other contact-related properties are used for the conductive material. Palladium constitutes one example of a suitable conductive material for forming a suitable contact to nanotubes. Titanium, gold, and platinum may also be suitable. Pd, Au, and Pt exhibit respective work functions of 5.1-5.6 eV, 5.1-5.5 eV, and 5.7 eV. The work function difference between a nanotube and a conductive material contact may be exploited to accomplish selective deposition of and/or selective removal of conductive material from nanotubes within certain ranges of conductivity.

FIG. 1 shows a substrate 10 with nanotubes 12 of intermediate length extending vertically from substrate 10. Nanotubes 12 have terminal ends 12a contacting substrate 10 and initial ends 12b elevationally above terminal ends 12a. A metal layer 14 is shown formed in contact with initial ends 12b of intermediate nanotubes 12 in FIG. 2. Metal layer 14 may be blanket deposited on initial ends 12b or selectively deposited. Given the possible conductivity differences among intermediate nanotubes 12, those of ordinary skill may appreciate conventional electrochemical deposition techniques suitable for selectively depositing metal layer 14.

Sputtering constitutes one suitable method of blanket deposition of a conductive material. Deposition of conductive material may be conformal over the tops and sidewalls of nanotubes contrary to that shown in FIG. 2 or may exist as shown in FIG. 2, depending upon spacing between nanotubes. Also, prior to conductive material deposition, an insulative material might be formed in the spaces between nanotubes and planarized back to expose initial ends 12b of nanotubes. As a further alternative, conventional techniques for growing nanotubes may be used that involve growing nanotubes through openings previously formed in insulative material, such as silicon dioxide. Thus, gaps between intermediate nanotubes 12 may be filled prior to deposition of metal layer 14.

Metal layer 14 may be deposited and/or subsequently patterned by known techniques to suitably function as an electrode or electrodes for applying a potential through intermediate nanotubes 12. A potential may be selected sufficient to deform nanotubes outside a selected range of effective conductivities. An exemplary potential includes from about 2 volts (V) to about 20 V, with 10 V being particularly suitable. The deforming may involve electrical breakdown of nanotubes similar to "blowing" a fuse. Relatively poor ohmic contact between metal layer 14 and intermediate nanotubes 12 that are semiconductive or insulative may protect them from deforming.

As indicated above, aspects of the invention apply to a variety of techniques for forming nanotubes. In some techniques, growth of tubes from a seed layer may be activated using an electric field, light, catalyst, etc. and the addition of new material for growth may occur at the interface between the nanotube terminal end and the seed layer. Deformations in the tube at the interface may hinder or preclude continued nanotube growth. Also, deformations in other parts of a nanotube may affect growth. For example, in electric field-assisted growth, deformations even at the initial end of a nanotube may change the electric field and hinder or preclude growth at the terminal end.

Figure 3:
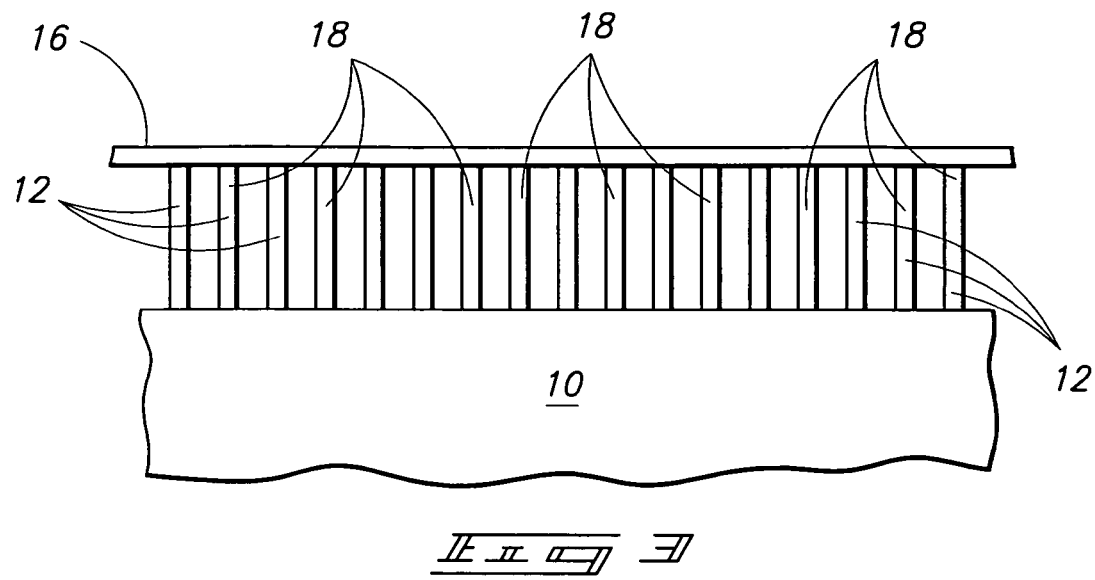
FIG. 3 is a side view of nanotubes at a process step subsequent to that shown in FIG. 3.
Figure 4:
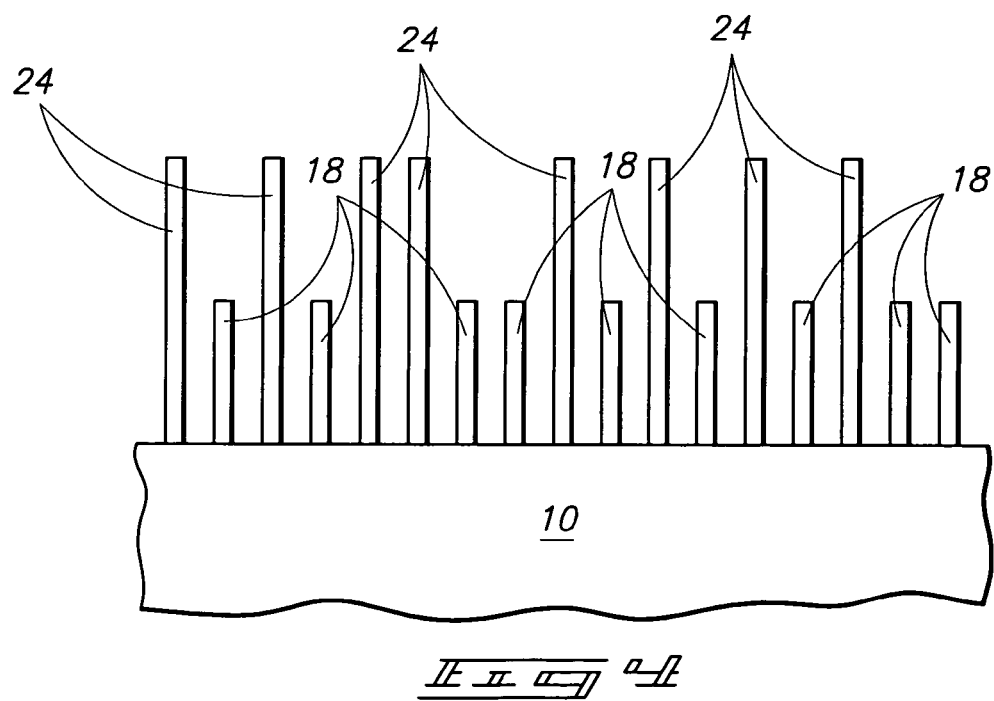
FIG. 4 is a side view of nanotubes at a process step subsequent to that shown in FIG. 3.

FIG. 3 shows a patterned metal layer 16 and intermediate nanotubes 12 after applying a potential to create deformed nanotubes 18. Deformed nanotubes 18 may be altered in such a manner that the growth rate of intermediate nanotubes 12 that were not deformed significantly exceeds the growth rate of deformed nanotubes 18. Further, deformed nanotubes 18 may be precluded from additional growth. Accordingly, FIG. 4 shows completed nanotubes 24 after removing patterned metal layer 16 and completing growth of intermediate nanotubes 12 exhibiting effective conductivities inside a selected range.

Alternative to or in addition to the application of a potential in FIG. 3, FIG. 5 shows the results of selectively etching metal layer 14. An etched metal layer 20 is shown with openings 22 exposing initial ends 12b of selected intermediate nanotubes 12. In one scenario, the work function difference between metallic (conductive) nanotubes and metal layer 14 may reduce the etch rate of portions of metal layer 14 over intermediate nanotubes 12 that are conductive. Accordingly, etched metal layer 20 remains over at least some intermediate nanotubes 12 while being removed over intermediate nanotubes 12 that are semiconductive or insulative. Completion of nanotube growth may then proceed as shown in FIG. 6 to produce completed nanotubes 24 since intermediate nanotubes in FIG. 6 remain masked by etched metal layer 20. It is conceivable that the described etching may be selective to portions of metal layer 14 over metallic nanotubes instead so intermediate nanotubes 12 that are semiconductive or insulative are instead masked.

Figure 7:
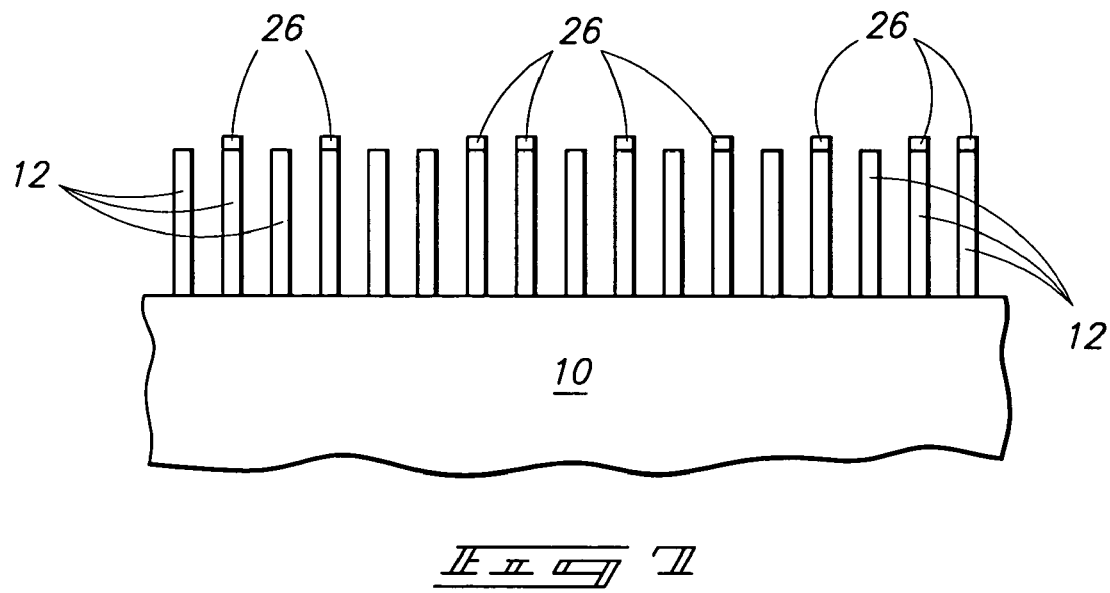
FIG. 7 is a side view of nanotubes at a process step subsequent to that shown in FIG. 1 according to an alternative aspect of the invention

As yet another alternative, FIG. 7 shows selectively deposited metal caps 26 on initial ends 12b of certain nanotubes 12 shown in FIG. 1. Nanotubes 12 on which metal caps 26 are formed may be metallic or exhibit some other range of effective conductivity facilitating the selective deposition. A variety of known methods exist for depositing a conductive material on selected portions of a substrate depending upon conductivity of the underlying substrate portions, for example, electrodeposition. Such methods may be applicable here.

Figure 8:
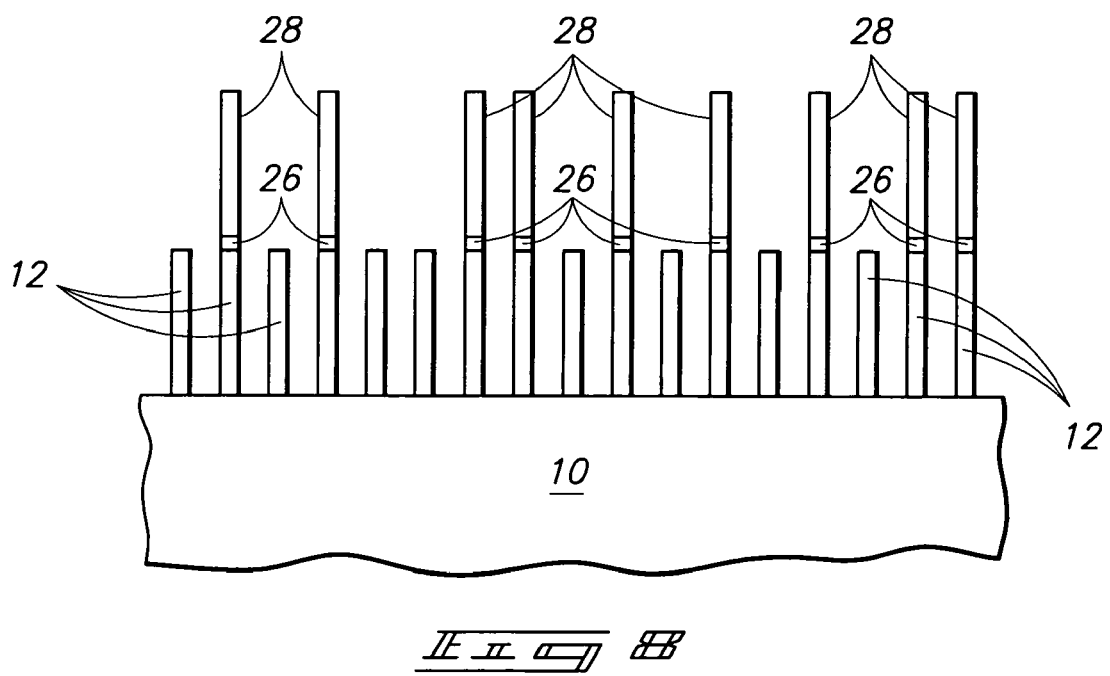
FIG. 8 is a side view of nanotubes at a process step subsequent to that shown in FIG. 7.

Metal caps 26 may provide or be modifiable to provide a seed layer for growth of extended nanotubes 28 shown in FIG. 8. During growth of extended nanotubes 28, their growth rate may significantly exceed the growth rate of underlying nanotubes 12 on which metal caps 26 are formed as well as other nanotubes 12. Due to diffusion limiting effects of nanotubes 12 extending from and restricting diffusion to substrate 10, metal caps 26 on initial ends 12b may be more accessible by nanotube growth precursors in comparison to terminal ends 12a. Accordingly, as extended nanotubes 28 grow, it follows that the growth rate of nanotubes 12 may be further restricted as extended nanotube 28 length increases. Even though FIG. 8 shows nanotube 12 length staying the same as in FIG. 7 and all of nanotubes 12 having equal length, some nanotube 12 growth may occur during extended nanotube 28 growth and/or capped nanotubes 12 may grow at a different rate in comparison to uncapped nanotubes 12.

It is conceivable that some extended nanotubes 28 may exhibit an effective conductivity different from the effective conductivity of nanotube 12 from which they are grown, due to the intervening metal caps 26 acting as seed layers. Accordingly, some of extended nanotubes 28 exhibiting a conductivity range may be joined by metal caps 26 to nanotubes 12 exhibiting the same conductivity range. Such joined nanotubes have a greater length than their uncapped counterparts. Also, some of extended nanotubes 28 may exhibit a conductivity range different from nanotubes 12 to which they are joined. Such joined nanotubes also have a greater length than their uncapped counterparts and further possess the unique structural feature in which nanotubes with different conductivities are joined by a conductive material. The unique structural feature may be useful in forming electronic devices that join materials of different conductivities with conductive material.

Accordingly, another aspect of the invention includes growing a plurality of nanotubes on a substrate at least to an intermediate length that is deterministic of nanotube intrinsic conductivity. Individual nanotubes have a terminal end contacting the substrate, have an initial end, and exhibit an effective conductivity, which varies among the plurality of nanotubes, with some of the effective conductivities being inside a selected range while others are outside the selected range. The method includes selectively depositing a conductive material in electrical contact with the initial ends of nanotubes exhibiting effective conductivities inside the selected range. A plurality of nanotubes are grown on the conductive material. Examples of suitable conductive materials include nickel, cobalt, iron, and combinations thereof.

In another aspect of the invention, a nanotube forming method includes growing a plurality of nanotubes on a substrate at least to an intermediate length that is deterministic of nanotube intrinsic conductivity. Individual nanotubes have a terminal end contacting the substrate, have an initial end, and exhibit an effective conductivity, which varies among the plurality of nanotubes, with some of the effective conductivities being inside a selected range while others are outside the selected range. The method includes depositing a conductive material in electrical contact with the initial ends of at least some of the nanotubes and screening out nanotubes exhibiting conductivities outside the selected range using at least some of the deposited conductive material.

The processing and other alternatives discussed herein with respect to any aspect of the inventions may also be applicable among the various other aspects of the invention, including the present aspect. For example, before depositing the conductive material, the method may further include stopping nanotube growth. Instead, before depositing the conductive material, the method may further include completing nanotube growth. FIGS. 1-8 only show conductive material formed on nanotubes of intermediate length and significant advantage exists in controlling nanotube conductivity during processing. Even so, aspects of the invention also include applying a potential between the terminal end and initial end of completed nanotubes and electrically deforming nanotubes exhibiting conductivities outside the selected range. Thereafter, nanotubes may be distinguished based upon their electrical characteristics, such as conductivity. Similarly, aspects of the invention also include selectively depositing a conductive material in electrical contact with the initial ends of completed nanotubes exhibiting effective conductivities inside a selected range and growing nanotubes on the conductive material. Thereafter, the selected nanotubes may include an extension nanotube joined by the conductive material.

Accordingly, in a further aspect of the invention, a nanotube forming method includes vertically growing a plurality of single-wall carbon nanotubes on a substrate to a completed length. Individual nanotubes exhibit an effective conductivity, which varies among the plurality of nanotubes, with some of the effective conductivities being inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes depositing a conductive material in electrical contact with the initial ends of at least some of the nanotubes, using at least some of the deposited conductive material, and deforming nanotubes exhibiting conductivities outside the selected range. By way of example, depositing the conductive material may include blanket depositing a metal layer over the nanotube initial ends and patterning the metal layer into metal lines.

In a yet further aspect of the invention, a nanotube forming method includes vertically growing a plurality of single-wall carbon nanotubes on a substrate at least to an intermediate length that is deterministic of nanotube intrinsic conductivity. Individual nanotubes exhibit an effective conductivity, which varies among the plurality of nanotubes, with some of the effective conductivities inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes stopping nanotube growth, depositing a conductive material in electrical contact with the initial ends of at least some of the nanotubes, using at least some of the deposited conductive material, and deforming nanotubes exhibiting conductivities outside the selected range. The method further includes completing growth of nanotubes exhibiting effective conductivities inside the selected range without completing growth of nanotubes exhibiting effective conductivities outside the selected range.

In a still further aspect of the invention, a nanotube forming method includes vertically growing a plurality of single-wall carbon nanotubes on a substrate at least to an intermediate length that is deterministic of nanotube intrinsic conductivity. Individual nanotubes exhibit an effective conductivity, which varies among the plurality of nanotubes, with some of the effective conductivities being inside a selected range while others are outside the selected range. The effective conductivity is exhibited between a nanotube terminal end contacting the substrate and a nanotube initial end elevationally above the terminal end and is determined primarily by intrinsic conductivity and/or nanotube defects. The method includes stopping nanotube growth and depositing a conductive material as a mask in electrical contact with the initial ends of at least the nanotubes exhibiting conductivities outside the selected range. The method further includes completing growth of nanotubes exhibiting effective conductivities inside the selected range without completing growth of nanotubes exhibited effective conductivities outside the selected range.

By way of example, the nanotubes exhibiting effective conductivities outside the selected range may consist of metallic nanotubes. Depositing the conductive material may include blanket depositing a metal layer over the nanotube initial ends and selectively etching the metal layer from the initial ends of semiconductive and insulative nanotubes. As an alternative, depositing the conductive material may include electrodepositing the conductive material on the initial ends of metallic nanotubes. Discussions herein regarding work function differences further explain the bases for selective etching of the deposited metal layer and selective depositing of conductive material on metallic nanotubes. The alternatives and advantages of the various aspects of the invention discussed herein may be appreciated from the foregoing description.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A nanotube forming method comprising:
    growing a plurality of nanotubes on a substrate at least to an intermediate length that is deterministic of nanotube intrinsic conductivity, individual nanotubes exhibiting an effective conductivity, which varies among the plurality of nanotubes, with some of the effective conductivities being inside a selected range while others are outside the selected range and individual nanotubes having a terminal end contacting the substrate and having an initial end;
    stopping nanotube growth;
    blanket depositing a conductive material over and in electrical contact with the nanotube initial ends;
    selectively etching conductive material from the initial ends of nanotubes exhibiting effective conductivities either inside or outside the selected range;
    using at least some of the deposited conductive material and screening out nanotubes exhibiting conductivities outside the selected range; and
    completing growth of nanotubes exhibiting effective conductivities inside the selected range without completing growth of nanotubes exhibiting effective conductivities outside the selected range.

2. The method of claim 1 wherein the growing comprises vertically growing and individual nanotubes have the initial end elevationally above the terminal end.

3. The method of claim 1 wherein the effective conductivity is exhibited between a nanotube terminal end contacting the substrate and a nanotube initial end and is determined primarily by intrinsic conductivity and/or nanotube defects.

4. The method of claim 1 wherein the screening out comprises deforming or masking nanotubes exhibiting conductivities outside the selected range.

5. The method of claim 1 wherein the screening out comprises:
    applying a potential between the terminal end and initial end of the nanotubes; and
    electrically deforming metallic nanotubes while not deforming semiconductive nanotubes and insulative nanotubes.

6. The method of claim 1 wherein the conductive material comprises a palladium layer.

7. The method of claim 1 wherein using the deposited conductive material comprises applying a potential.

8. The method of claim 1 wherein using the deposited conductive material comprises masking selected initial ends.

9. The method of claim 1 wherein the nanotubes comprise carbon nanotubes.

10. The method of claim 1 wherein the nanotubes comprise single-wall nanotubes.

11. A nanotube forming method comprising:

vertically growing a plurality of single-wall carbon nanotubes on a substrate at least to an intermediate length that is deterministic of nanotube intrinsic conductivity, individual nanotubes exhibiting an effective conductivity, which varies among the plurality of nanotubes, with some of the effective conductivities being inside a selected range while others are outside the selected range, the effective conductivity being exhibited between a nanotube terminal end contacting the substrate and a nanotube initial end elevationally above the terminal end and being determined primarily by intrinsic conductivity and/or nanotube defects, and the nanotubes that exhibit effective conductivities outside the selected range consisting of metallic nanotubes;

stopping nanotube growth;

blanket depositing a conductive metal layer as a mask in electrical contact with the initial ends of the nanotubes;

selectively etching the metal layer from the initial ends of semiconductive and insulative nanotubes; and completing growth of nanotubes exhibiting effective conductivities inside the selected range without completing growth of nanotubes exhibiting effective conductivities outside the selected range.

12. The method of claim 11 wherein the conductive metal layer comprises a palladium layer.

* * * * *